United States Patent [19]

Ross

[11] 3,908,962
[45] Sept. 30, 1975

[54] METHOD FOR STRINGING POWER LINES

[76] Inventor: Arthur W. Ross, 94 Brimbal Ave., Beverly, Mass. 01915

[22] Filed: Sept. 3, 1974

[21] Appl. No.: 503,040

[52] U.S. Cl. .......................................... 254/134.3 R
[51] Int. Cl.² ......................................... E21C 29/16
[58] Field of Search ............ 254/134.3 R, 134.3 PA, 254/192–197

[56] References Cited
UNITED STATES PATENTS

| | | | |
|---|---|---|---|
| 692,864 | 2/1902 | Lantz | 254/194 |
| 797,769 | 8/1905 | Hall | 254/195 |
| 798,652 | 9/1905 | Baughman | 254/193 |
| 2,983,037 | 5/1961 | Hendrix | 254/134.3 R |
| 3,596,878 | 8/1971 | Parsen | 254/134.3 R |

*Primary Examiner*—Al Lawrence Smith
*Assistant Examiner*—Robert C. Watson
*Attorney, Agent, or Firm*—Wolf, Greenfield & Sacks

[57] ABSTRACT

The method is for installing a multi-wire power distribution line to be hung between spaced poles. Rather than supporting and installing the wires using a plurality of pulley clusters as is practiced in the prior art, the wires are supported and installed by spacers which are in turn hung by a pulley means from the tensioned messenger wire. As the wires are pulled, the combination spacer and pulley means are attached at predetermined intervals. When the run has been installed and tested then the pulley means is removed and the spacer is hung directly from the messenger wire.

6 Claims, 6 Drawing Figures

PRIOR ART

METHOD FOR STRINGING POWER LINES

BACKGROUND OF THE INVENTION

The present invention relates, in general, to a method and apparatus for stringing power distribution lines. More particularly, the present invention relates to an improved method and apparatus that enables easier and quicker installation of power lines or cables.

A typical prior art installation procedure requires the use of a plurality of rather bulky pulley clusters, each of which comprises a series of pulleys for accommodating each of the wires that are to be installed. Also, there are required tag lines that extend between each pulley cluster for positioning the pulley clusters the proper predetermined distance as they are pulled. A typical installation procedure is shown in a booklet entitled "Hendrix Aerial Cable Systems" produced by Hendrix Wire and Cable Corporation dated April 1970 and found on page 2D. Hereinafter this prior art operation will be discussed in more detail with reference to the prior art drawing shown in FIG. 1.

One of the disadvantages associated with this prior art installation procedure is that the pulley clusters are heavy, expensive and bulky and pose a hazzard to the public in that it is possible that they could fall from the messenger wire from which they are supported. Also, generally the wires that are extending through the pulley cluster may not be made alive until the pulley clusters have been completely removed and plastic spacers substituted in their place. Therefore, the prior art installation procedure requires an excessive number of steps before completion. For example, when reconductoring an existing line, it is advantageous to be able to make the new wires alive prior to removal of the old construction. In the prior art this generally requires the two precedures of replacing the pulley clusters with the spacers and, after testing the new line, removing the old construction.

Accordingly, one of the objects of the present invention is to provide an improved method and apparatus for stringing power lines or installing cables that does not require the use of the heretofor mentioned heavy and expensive pulley clusters.

Another object of the present invention is to provide a method and apparatus in accordance with the preceding object and wherein the wires can be made alive as soon as they are strung.

Still a further object of the present invention is to provide a method and apparatus for stringing power lines wherein once they are in place the lines can be secured in their final position and the old lines removed at the same time.

SUMMARY OF THE INVENTION

To accomplish the foregoing and other objects of this invention, there is disclosed herein a method of installing a power distribution line. The power distribution system may be of the type that has a plurality of individual wires including a support wire installed between existing poles. These wires may be finally supported from the supporting wire by means of an insulating spacer. In accordance with the method of the present invention, there is provided a support member that may be in the form of a fixed pulley cluster and which is installed at a fixed position at the beginning of a run. A plurality of side by side wires are passed through the support member and are pulled, in unison. A plurality of pulley means are provided which are hung from the supporting wire and include means for receiving the spacer. One spacer is hung from each pulley means and this combination is secured each at predetermined distances along the wires as the wires are pulled. After the run has been completed, the pulley means are then removed and the spacers are hung directly from the supporting wire.

BRIEF DESCRIPTION OF THE DRAWINGS

Numerous other objects, features and advantages of the invention will now become apparent upon a reading of the following detailed description taken in conjunction with the accompanying drawings, in which.

DETAILED DESCRIPTION

Figure 1:
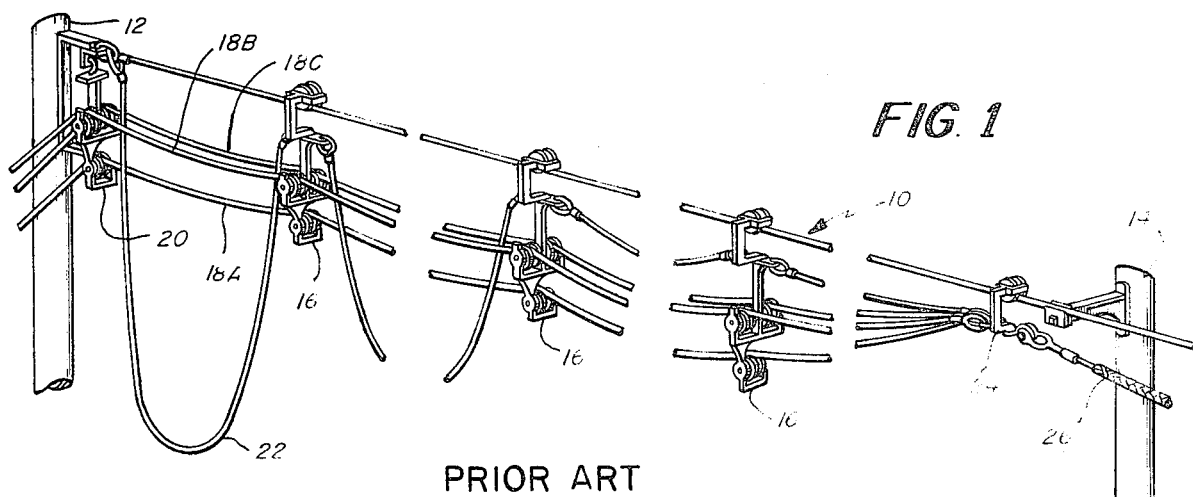
FIG. 1 shows a typical prior art power line installation procedure.

FIG. 1 shows a typical prior art installation. In FIG. 1 there is shown a messenger wire 10 that is suitably strung between poles 12 and 14. A plurality of pulley clusters are supported from the messenger wire 10 and each support the three wires 18A, 18B and 18C, which are to be installed. There is also provided a fixed pulley cluster 20 which is similar to the pulley clusters 18 except that it does not move along a messenger wire. The three wires extend through the pulley cluster 20 and, in turn, through the other pulley clusters 16, as shown.

In this procedure there is also provided a tag line 22 which connects between adjacent pulley clusters. All of the wires 18A, 18B and 18C and the tag line 22 from the most forward pulley cluster connect to a common support pulley 24 which is pulled along the messenger wire 10 by means of a pulling rope 26 which may extend down to the ground to a winch.

When all of the tag lines 22 have been pulled outwardly then all of the pulley clusters are in their proper spaced position.

Figure 4:
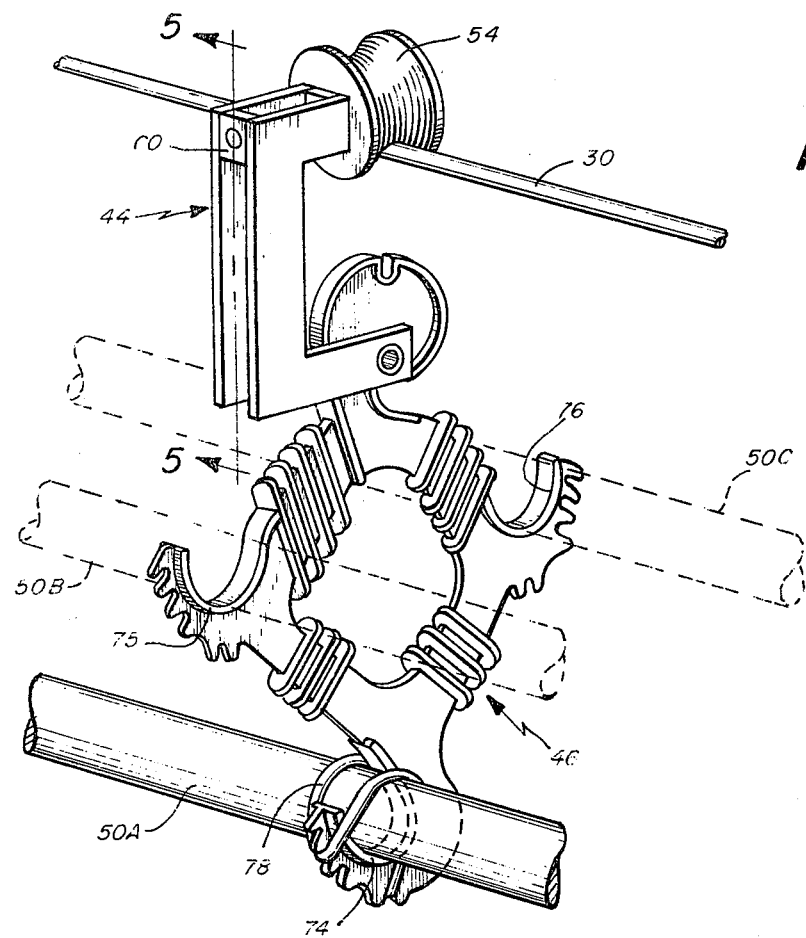
FIG. 4 shows the spacer and pulley means of this invention supported from a messenger wire.

In this prior art procedure, the pulley clusters are very bulky and heavy and in order to make the wires alive, the pulley clusters must be removed, one at a time, and a spacer such as the one shown in FIG. 4 is substituted in its place. After this procedure has been completed and the wires are made alive then the crew has to go back and remove the old construction.

With the procedure of the present invention, because the wires can be made alive earlier in the procedure, the old construction can be removed at the same time that the spacers are hung from the messenger wire.

Figure 2:
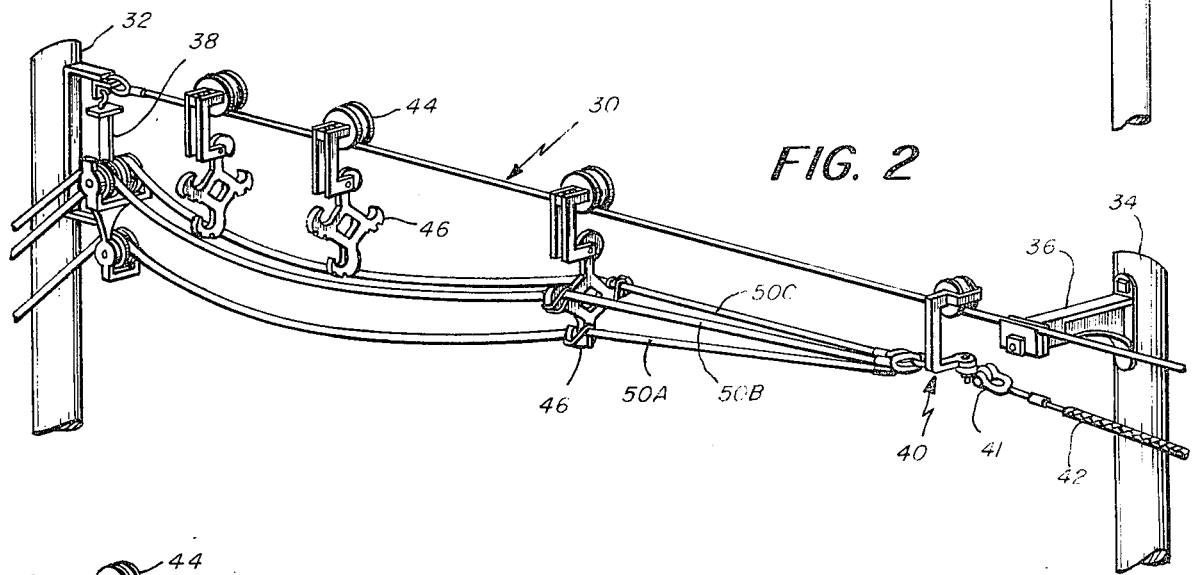
FIG. 2 shows the installation procedure of the present invention at an initial stage of the installation.

Referring now to FIG. 2, there is shown the initial portion of the procedure of this invention. In FIG. 2 there is shown a messenger wire 30 connected between poles 32 and 34. A suitable bracket 36 which is well known in the art may be used for supporting the message wire 30 from the pole 34. At the pole 32 there is provided one fixed pulley cluster 38 which functions similarly to the pulley cluster 20, shown in FIG. 1. FIG.

2 also shows a common support pulley 40 and line 42 similar to the support pulley and line 26 shown in FIG. 1.

In the procedure of this invention, there is provided a plurality of support pulleys 44 each having extending therefrom a spacer 46. In FIG. 2 one of the spacers 46 is shown as having the wires 50A, 50B and 50C extending therethrough. One embodiment for the spacer 46 is shown in more detail, hereinafter, in FIG. 4.

Figure 3:
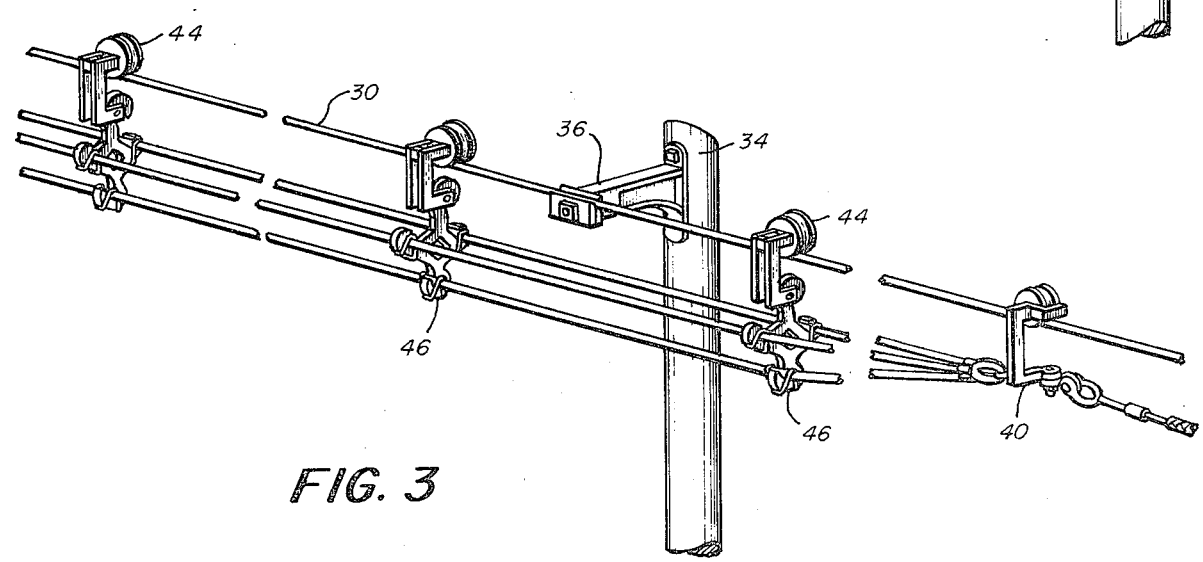
FIG. 3 shows the installation procedure of the present invention at a different point in the procedure.

FIG. 3 shows a view similar to that shown in FIG. 2 but with a plurality of the combination pulley and spacer disposed at the desired intervals along the messenger wire 30.

A typical installation may be where the run is to be from 2 to 3 thousand feet. The wire that is to be installed, may be disposed in three separate reels which are disposed adjacent the first pole of the run which, in FIG. 2, is pole 32. The three wires are then installed through the multiple pulley arrangement 38 and are fastened to the pulling pulley 40. It is preferable that the rope 42 connect to the pulley member 40 by means of a swivel 41. The pulling rope 42 may connect to a take-up reel in a vehicle and would be initially pulled so that any slack could be taken up.

A lineman may then be placed about 25 feet out from the first pole under the messenger wire. The truck that is used for pulling the rope 42 may then proceed to pull the three wires in a predetermined distance of about 50 feet. He then hangs the wires into a spacer which is supported from the pulley 44 and secures at least one of the wires in the spacer. The pulling vehicle then proceeds to pull again and at the right predetermined distance, which could be marked on the three conductor wires, the wires are again placed in another spacer supported by the pulley 44. Thus, about every 30 feet without having to interrupt the pulling process, a combination pulley and spacer will be tied into the three wire line that is being installed with the pulley being pulled along the messenger wire as the pulling rope is moved.

After this process has been completed the new conductors can be parallel connected at both ends. With this procedure the wires can now be made alive for testing purposes. Thereafter, in an essentially one step operation, the old conductor wires can be removed and as the crew moves from spacer to spacer the pulley member 44 is simply removed and its associated spacer 46 is hung on the messenger wire 30.

Figure 5:
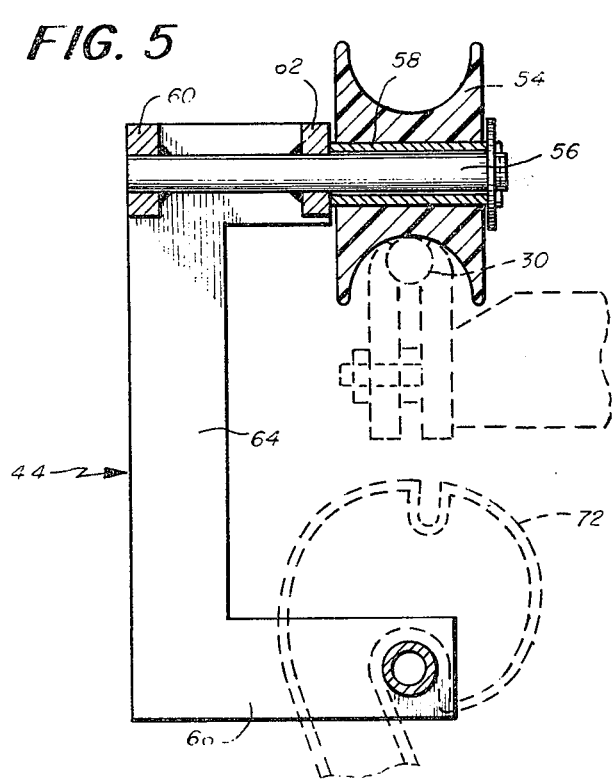
FIG. 5 is a cross-sectional view taken along line 4—4 of FIG. 4.
Figure 6:
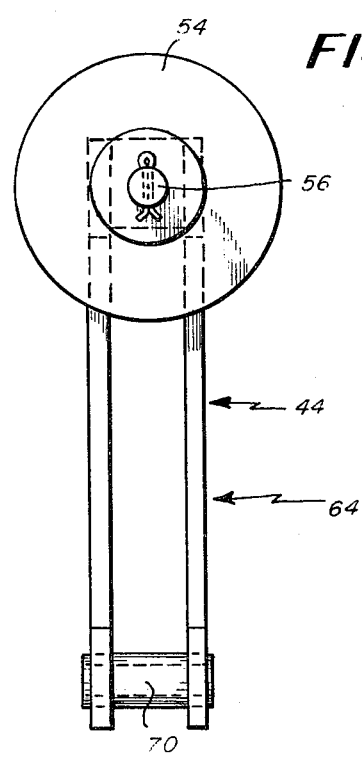
FIG. 6 is a side view of the pulley means shown in FIG. 5.

FIG. 4 is a perspective view showing in more detail the pulley member 44 and the spacer 46. The pulley member 44 includes a pulley 54 (see also FIGS. 5 and 6) which engages with the messenger wire 30. The pulley 54 is supported by a shaft 56 and a bushing 58. The end of the shaft 56 is supported in a fixed manner from members 60 and 62. The pulley member 44 is of generally C-shape and includes a vertical portion 64 and a lower portion 66. The portions 64 and 66 are defined by parallel plates which are joined by post 70, shown in FIG. 6. The top hook shaped end 72 of the spacer 46 engages with the post 70 and the spacer is thereby supported from the pulley member 44.

As indicated in FIG. 4, the spacer 46 is of a general diamond shape and has a bottom recess 74 for accommodating wire 50A. The other two wires 50B and 50C are supported in recesses 75 and 76, respectively. FIG. 4 shows the wire 50A as being maintained in place by means of a securing loop 74. Similar securing loops could also be used for the other wires 50B and 50C.

When the securing loop is in place and the wires are commonly pulled together then the pulley member 44 is moved along the messenger wire 30.

When all of the spacers and their associated pulley members are in the proper predetermined place and spaced the proper distance then it is quite easy to remove the pulley member and simply hang the spacer from the messenger wire. The hook shaped end 72 of the spacer engages with the messenger wire 30.

What is claimed is:

1. A method of installing a power distribution line having a plurality of individual wires including a supporting wire installed between existing poles and wherein said wires are finally supported from said supporting wire by means of an insulating spacer, said method comprising the steps of;
    providing a support member,
    installing the support member at a fixed position at the beginning of a run,
    passing a plurality of side by side wires through the support member,
    providing means for pulling in unison the plurality of wires,
    providing a pulley means which is hung from the supporting wire and includes means for receiving the spacer,
    hanging the spacer from the pulley means with the wires being supported by the spacer,
    hanging further spacers and pulley means from the supporting wire at predetermined distances along the wires as said wires are pulled,
    and after the run has been completed removing the pulley means and hanging the spacers from the supporting wire.

2. The method of claim 1 wherein the supporting wire is a messenger wire.

3. A method of installing a power distribution line having a plurality of individual wires including a supporting wire installed between existing poles and wherein said wires are finally supported from said supporting wire by means of an insulating spacer, said method comprising the steps of;
    supporting a plurality of side by side wires at the beginning of a run,
    pulling the plurality of wires in unison,
    providing a mobile means which is hung from the supporting wire,
    hanging the spacer from the mobile means with the wires being supported by the spacer,
    hanging additional spacers and mobile means from the supporting wire at predetermined distances along the wires as said wires are pulled,
    and thereafter removing the mobile means and hanging the spacers from the supporting wire.

4. The method of claim 3 wherein the step of supporting a plurality of wires includes the steps of;
    providing a support member,
    installing the support member at a fixed position at the beginning of a run,
    and passing the wires through the support member.

5. The method of claim 3 wherein the mobile means includes a pulley means.

6. The method of claim 3 further securing the wires in the spacer so that the spacer and associated mobile means is pulled when the wires are pulled.

* * * * *